US006210036B1

(12) United States Patent
Eberle et al.

(10) Patent No.: US 6,210,036 B1
(45) Date of Patent: *Apr. 3, 2001

(54) CONNECTOR THERMAL SENSOR

(76) Inventors: Gerald P. Eberle, 200 Oxford Way, Belmont, CA (US) 94002-2564; Alan J. Janis, P.O. Box 3453, Fairfield, CA (US) 94533

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,436

(22) Filed: Aug. 27, 1997

Related U.S. Application Data

(60) Provisional application No. 60/025,562, filed on Sep. 6, 1996.

(51) Int. Cl.[7] ........................ G01K 1/12; H01H 37/32; H02H 1/00

(52) U.S. Cl. ........................ 374/141; 374/208; 439/913; 439/911; 337/2; 361/103

(58) Field of Search ........................ 374/141, 208; 337/92, 91, 2, 56; 439/911, 913; 361/103

(56) References Cited

U.S. PATENT DOCUMENTS

| | | | | |
|---|---|---|---|---|
| 3,558,987 | * | 1/1971 | Lewis | 317/33 |
| 5,463,375 | * | 10/1995 | Bauer | 374/208 |
| 5,590,010 | * | 12/1996 | Ceola et al. | 361/93 |
| 5,600,306 | * | 2/1997 | Ichikawa et al. | 340/584 |
| 5,742,464 | * | 4/1998 | Ceola et al. | 361/103 |

FOREIGN PATENT DOCUMENTS

| | | | | |
|---|---|---|---|---|
| 2126805 | * | 3/1984 | (GB) | 439/911 |

* cited by examiner

*Primary Examiner*—G. Bradley Bennett
*Assistant Examiner*—Gail Verbitsky
(74) *Attorney, Agent, or Firm*—C. Michael Zimmerman

(57) ABSTRACT

An aircraft ground connector is described for delivering electrical power to aircraft parked at airports. The connector includes a thermal sensor arrangement which is positioned in the normal insulating body of such connector, which sensor reacts to a rise of temperature in such body higher than a predetermined temperature by cutting off the flow of electrical power through the body.

11 Claims, 6 Drawing Sheets

#5 PLUG
FACE

#5 PLUG
RIGHT SECTION

PRIOR ART
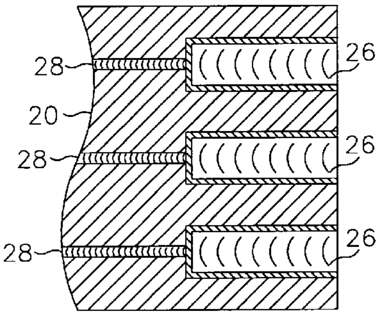
FIG.1A
#1 PLUG
LEFT SECTION
PRIOR ART
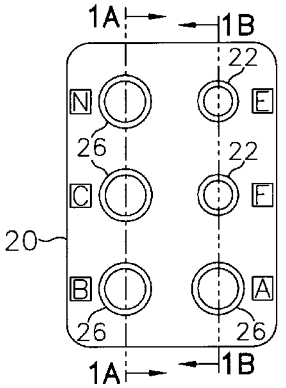
FIG.1
#1 PLUG
FACE
PRIOR ART
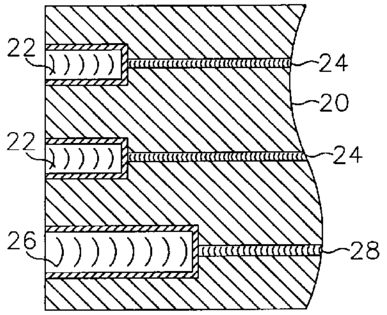
FIG.1B
#1 PLUG
RIGHT SECTION
PRIOR ART
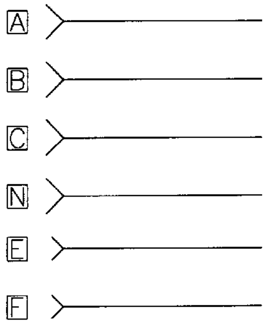
FIG.1C
#1 PLUG
SCHEMATIC
PRIOR ART
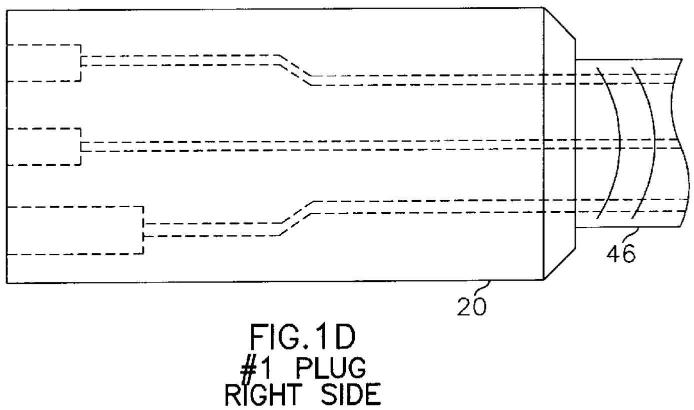
FIG.1D
#1 PLUG
RIGHT SIDE
PRIOR ART
A,B,C,N ≻— = POWER CONTACT, 26
E,F ≻— = CONTROL CONTACT, 22
FIG.1E
#1–PLUG
SCHEMATIC LEGEND

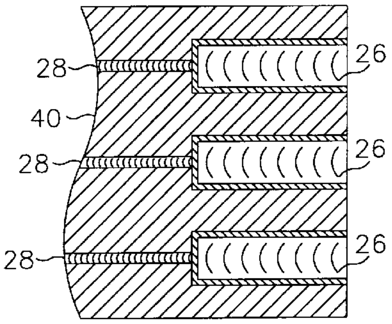
FIG.2A
#2 PLUG
LEFT SECTION
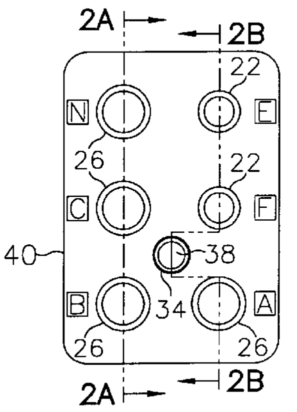
FIG.2
#2 PLUG
FACE
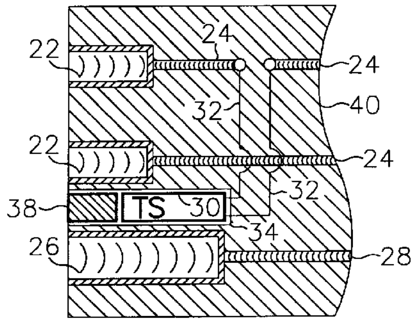
2B
#2 PLUG
RIGHT SECTION
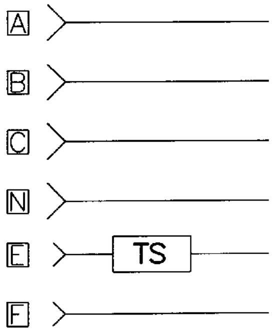
FIG.2C
#2 PLUG
SCHEMATIC
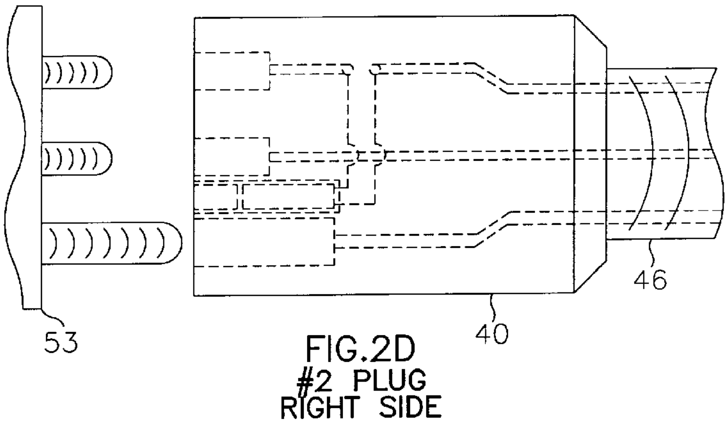
FIG.2D
#2 PLUG
RIGHT SIDE
TS = THERMAL SENSOR, 30
A,B,C,N,+,− ≻— = POWER CONTACT, 26
E,F,R ≻— = CONTROL CONTACT, 22
FIG.2E
#2–#4 PLUGS
SCHEMATIC LEGEND

#3 PLUG
LEFT SECTION

#3 PLUG
FACE

#3 PLUG
RIGHT SECTION

#3 PLUG
SCHEMATIC

#3 PLUG
RIGHT SIDE

#4 PLUG
FACE

#4 PLUG
RIGHT SECTION

4B
#4 PLUG
SCHEMATIC

#4 PLUG
RIGHT SIDE

#5 PLUG
FACE

#5 PLUG
RIGHT SECTION

#5 PLUG
SCHEMATIC

#5 PLUG
REAR

#5 PLUG
LEFT SECTION

#5–#6 PLUGS
SCHEMATIC LEGEND

#6 PLUG
FACE

#6 PLUG
RIGHT SECTION

#6 PLUG
SCHEMATIC

#6 PLUG
REAR

#6 PLUG
LEFT SECTION

CONNECTOR THERMAL SENSOR

CROSS REFERENCE TO RELATED APPLICATION

This application claims the benefit of Provisional Patent Application Ser. No. 60/025562, filed Sep. 06, 1996.

BACKGROUND OF THE INVENTION

This invention relates to temperature management, specifically to limiting the temperature rise within an aircraft ground power connector.

Presently, a parked aircraft receives external electrical energy via a ground power cable provided with an electrical plug. (By "ground" power cable is meant a cable connected to power on the ground at an airport rather than power provided by an aircraft visiting such airport.) The ground power plug is installed to a mating receptacle complimentary power connector 53 on the aircraft, thus completing the connection from a ground power source to the aircraft.

Conditions exist wherein the electrical power contacts, either on the ground power plug or on the aircraft receptacle have become unfit for service because of wear or physical damage.

Often, the wear or damage goes unnoticed and an unfit connector is put into service. The damage manifests itself in the form of excessive electrical contact resistance with attendant energy loss in the form of heat. Power levels for aircraft electrical service are high, thus poor connections are able to produce a large amount of destructive heat in a brief period. The heat produced can and does cause costly damage to the aircraft as well as to ground power plug assembly.

At present, no known attempt has been made to automatically prevent the application of an unserviceable connector, either on the aircraft or ground equipment. Manual inspection tools are available, but are employed only if connector damage is noticed or during periodic inspection.

This invention automatically causes the removal of electrical energy from a connector that is experiencing excessive temperature rise, thus minimizing the risk of thermal damage to the aircraft or ground equipment.

SUMMARY OF THE INVENTION

In accordance with the present invention, a connector thermal sensor comprises an electrical thermal sensing device incorporated into the body of an electrical connector assembly. The connector thermal sensor is located within the electrical connector body such that the sensor is thermally coupled to the electrical power contacts. Thus, the connector thermal sensor will provide an indication of the heat or energy loss produced by the electrical power contacts. The indication provided by the connector thermal sensor is communicated to remote equipment responsible for controlling the energy presented to the electrical power contacts. The connector thermal sensor permits energy passing through the power contacts to be managed, and in so doing minimizes the risk of thermal damage caused by excessive energy loss within a connector assembly.

Accordingly, several objects and advantages of our connector plug thermal sensor are:

(a) to minimize the risk of aircraft damage caused by a poor quality connection to a ground power source;

(b) to reduce the risk of damage to ground power components;

(c) to reduce aircraft departure delays caused by aircraft ground power difficulties;

(d) to reduce the usage of power sources aboard the aircraft, thus reducing both air and noise pollution;

(e) to reduce the amount of fuel consumed by aircraft onboard power sources while the aircraft is parked;

(f) to provide a safety device that functions without modification of an existing system;

(g) to promote a safe operating environment by providing for cost effective, automatic control of a known hazard.

Still further objects and advantages will become apparent from a consideration of the ensuing description and accompanying drawings.

BRIEF DESCRIPTION OF THE DRAWINGS

The drawing figures classify aircraft-ground-power electrical plugs by number, for instance #1 PLUG, for reference on these drawings only.

FIG. 1 shows a face view of conventional, #1, aircraft ground-power plug.

FIG. 1A shows a partial section view, with three power contacts, of the left side of #1 plug.

FIG. 1B shows a partial section view, with one power contact and two control contacts, of the right side of #1 plug.

FIG. 1C shows an electrical schematic of #1 plug.

FIG. 1D shows a right side view of #1 plug.

FIG. 1E shows a legend defining the schematic symbols in FIG. 1C.

FIG. 2 shows a face view of single sensor, modified, #2 aircraft ground-power plug.

FIG. 2A shows a partial section view, with three power contacts, of the left side of #2 plug.

FIG. 2B shows a partial section view of the right side of #2 plug.

FIG. 2C shows an electrical schematic of #2 plug.

FIG. 2D shows a right side view of #2 plug.

FIG. 2E shows a legend defining the schematic symbols in FIGS. 2C, 3C and 4B (plugs #2, #3, &#4).

FIG. 4B shows an electrical schematic of #4 plug.

DETAILED OF THE INVENTION

Figure 3A:
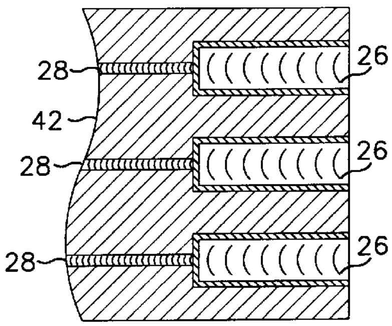
FIG. 3A shows a partial section view of the left side of #3 plug.

FIGS. 1–1E show "#1 plug", a conventional, un-modified, three phase, 400 Hertz, aircraft ground power plug connector 20 shaped to interact with a complementary power socket on an aircraft. A power contact socket 26 (FIGS. 1, 1A & 1B) is provided for each of three voltage phases and neutral. A power conductor 28 or, in other words, an electric power lead is connected to each power contact socket 26. A control contact socket 22 (FIGS. 1, 1A & 1B) is provided for each of two control circuits. A control conductor 24 or, in other words, a control lead is connected to each control contact socket 22.

Plug 20 provides a direct through path for power and control conductors.

A power cable 46 is attached to the end of plug 20. Power cable 46 houses power conductors 28 and control conductors 24. Power cable 46 connects power contact sockets 26 to a power source. Power cable 46 also usually, connects control contact sockets 22 to a power source control circuit.

Description—Preferred Embodiment—FIGS. 2–2E

FIG. 2 shows the face of a modified, aircraft ground power plug 40. Shown are a thermal sensor cavity 34, a cavity seal 38, power contact sockets 26, and control contact sockets 22. FIG. 2A shows a partial left section of plug 40 with power contact sockets 26 and power conductors 28. FIG. 2B shows a partial right section of plug 40, with thermal sensor 30, thermal sensor cavity 34, and cavity seal 38.

Thermal sensor 30 (FIG. 2B) is positioned interstitially amongst three power socket contacts 26 and one control contact socket 22. The three power socket contacts 26 are associated with voltage phases A, B, and C.

Thermal sensor 30 (FIGS. 2B & 2C) is series connected into at least one control conductor 24, via a thermal sensor wire 32.

In most instances, thermal sensor 30 will be a normally closed, contact type switch. Other types of sensing devices may be employed.

Figure 3:
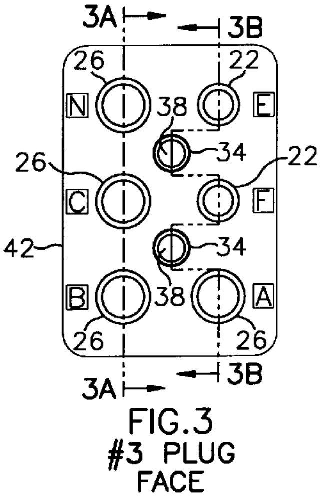
FIG. 3 shows a face view of dual sensor, modified, #3 aircraft ground-power plug,.
Figure 3B:
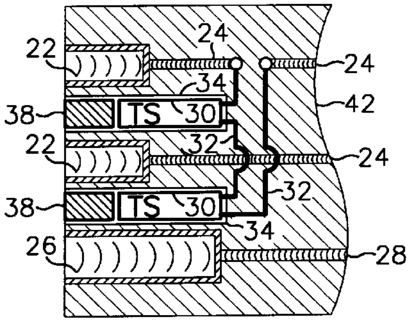
FIG. 3B shows a partial section view of the right side of #3 plug.

Thermal sensor 30 (FIG. 2B) is connected within thermal sensor cavity 34. As shown, cavity seal 38 (FIG. 2B) closes an open end of cavity 34 to prevent environmental intrusion into thermal sensor cavity 34. Description—Alternate Embodiments—FIGS. 3–6D Thermal sensor 30 (FIGS. 3, & 3B) is provided in two places in an alternate embodiment of our "Connector Thermal Sensor". This alternate embodiment places an additional thermal sensor 30, thermal sensor cavity 34, and cavity seal 38 near power contact socket 26 [N].

Figure 3C:
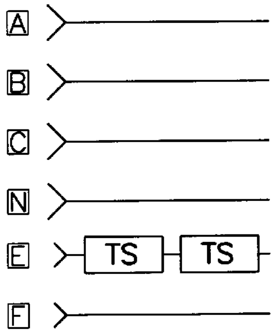
FIG. 3C shows an electrical schematic of #3 plug.

Thermal sensors 30 (FIGS. 3B & 3C) are shown electrically connected in series.

Figure 3D:
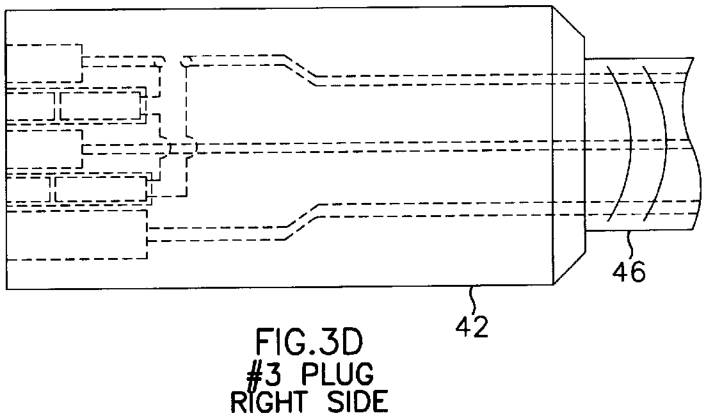
FIG. 3D shows a right side view of #3 plug.

Figure descriptions for #2 plug (FIGS. 2–2E) apply to #3 plug (FIGS. 3–3D), with an additional thermal sensor 30, thermal sensor cavity 34, and cavity seal 38 in the #3 plug.

Figure 4:
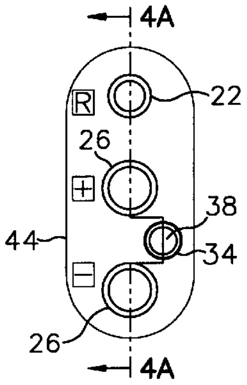
FIG. 4 shows a face view of #4 plug.
Figure 4A:
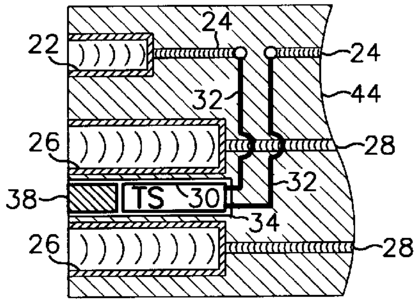
FIG. 4A shows a partial section view of the right side of #4 plug.
Figure 4C:
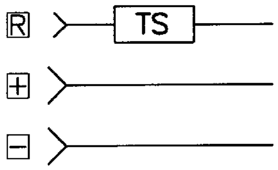
FIG. 4C shows a right side view of #4 plug.
Figure 4C:
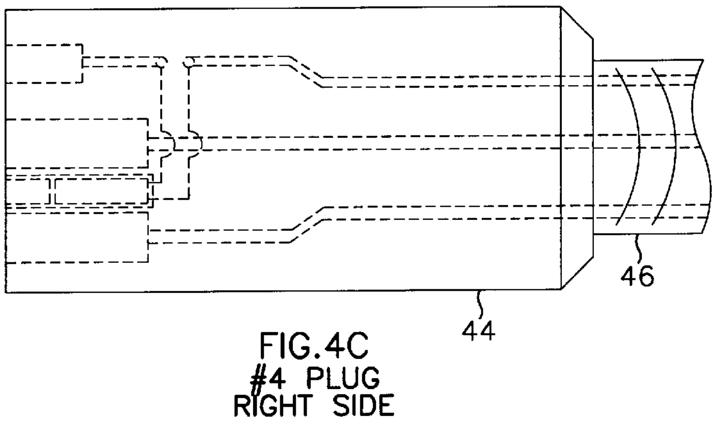

FIGS. 4–4C show #4 plug, an alternate embodiment of our "Connector Thermal Sensor". This plug is equipped with one control contact socket 22, two power contact sockets 26, and one thermal sensor 30 (FIGS. 4 & 4A).

FIG. 4B shows an electrical schematic of #4 plug. FIG. 4C shows a right side view of #4 plug.

Figure descriptions for #2 plug (FIGS. 2–2E) apply to #4 plug (FIGS. 4–4C), with one fewer control contact socket 22 and two fewer power contact sockets 26 in #4 plug.

Figure 5:
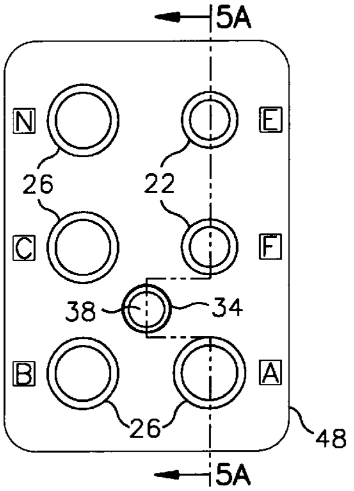
FIG. 5 shows a face view of single sensor, modified, #5 aircraft ground-power plug replaceable nose section.
Figure 5A:
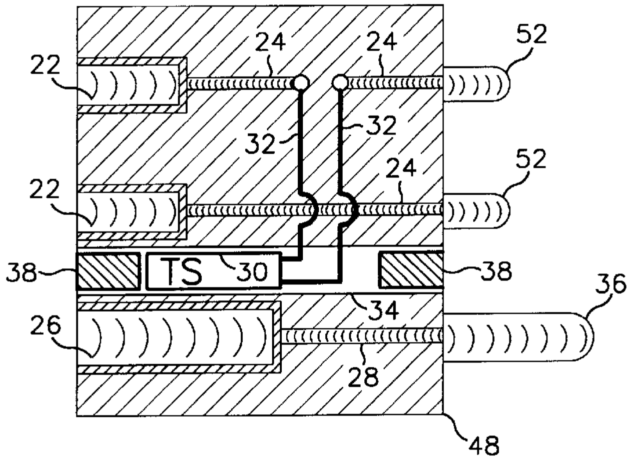
FIG. 5A shows a partial section view of the right side of #5 replaceable plug nose.
Figure 5B:
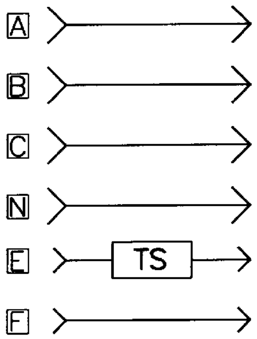
FIG. 5B shows an electrical schematic of #5 replaceable plug nose.
Figure 5C:
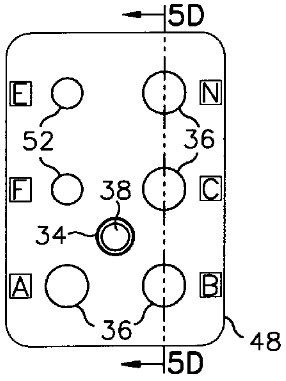
FIG. 5C shows a rear view of #5 replaceable plug nose.
Figure 5D:
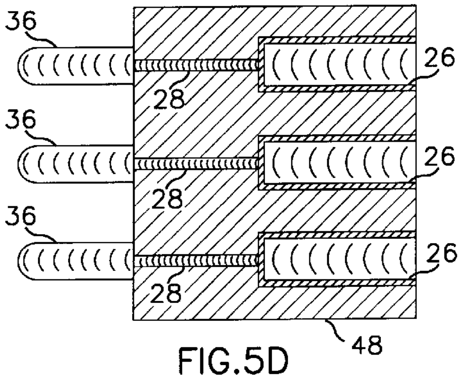
FIG. 5D shows a partial section view of the left side of #5 replaceable plug nose.
Figure 5E:
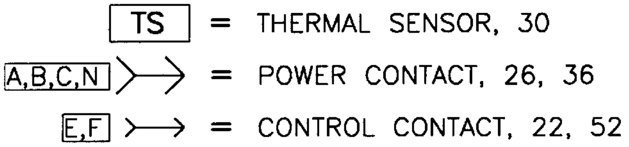
FIG. 5E shows a legend defining the schematic symbols in FIGS. 5B & 6B.

FIGS. 5–5E show #5 plug, an alternate embodiment of our "Connector Thermal Sensor". This plug is a replaceable nose or contact section. The #5 plug is fitted to the contact end of certain aircraft ground power plugs, similar to #1 plug (FIGS. 1–1E), to enhance repairability.

The rear side of #5 plug (FIG. 5C) is equipped with a projecting control contact pin 52 on each control conductor 24 (FIG. 5A) and a projecting power contact pin 36 on each power conductor 28 (FIGS. 5A & 5D). As illustrated this results in the pins being electrically connected in series within the body of the plug, with their corresponding sockets.

Thermal sensor cavity 34 and cavity seal 38 (FIGS. 5, 5A & 5C) may be provided on the rear surface, front surface or both. surfaces Figure descriptions for #2 plug (FIGS. 2–2E) apply to #5 plug (FIGS. 5–5E), with the inclusion of control contact pins 52, power contact pins 36 (FIGS. 5A & 5D), and absence of power cable 46 (FIG. 2D) in #5 plug.

Figure 6:
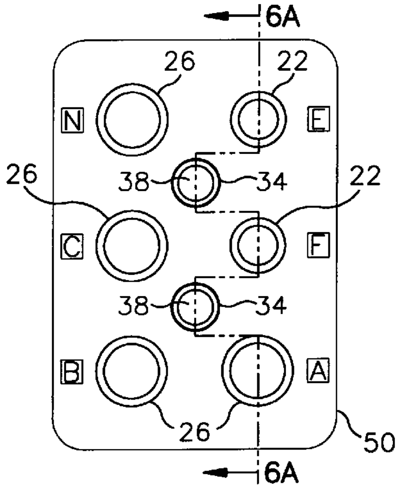
FIG. 6 shows a face view of a dual sensor, modified, #6 aircraft ground-power plug replaceable nose section.
Figure 6A:
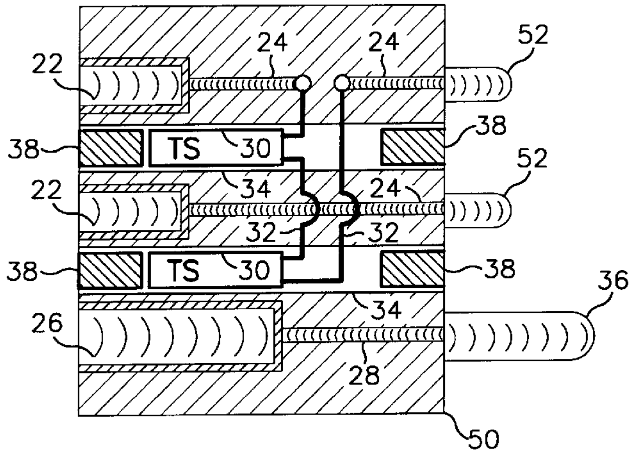
FIG. 6A shows a partial section view of the right side of #6 replaceable plug nose.
Figure 6B:
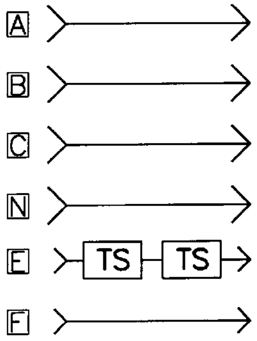
FIG. 6B shows an electrical schematic of #6 replaceable plug nose.
Figure 6C:
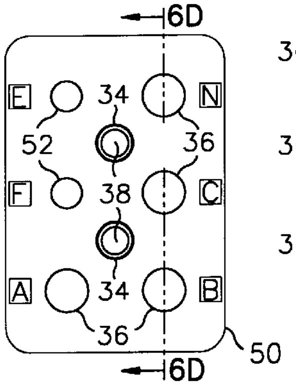
FIG. 6C shows a rear view of #6 replaceable plug nose.
Figure 6D:
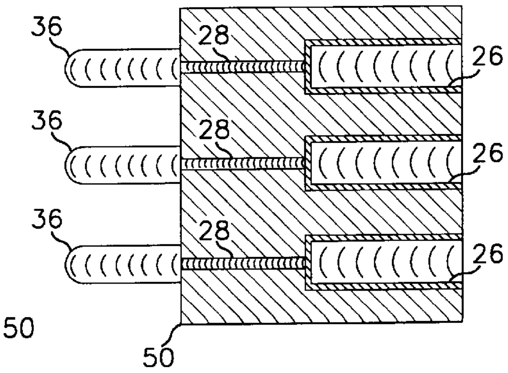
FIG. 6D shows a partial section view of the left side of #6 replaceable plug nose.

FIGS. 6–6D show #6 plug, an alternate embodiment of our "Connector Thermal Sensor". This plug is a replaceable nose or contact section. The #6 plug is fitted to the contact end of certain aircraft ground power plugs, similar to #1 plug (FIGS. 1–1E), to enhance repairability.

This alternate embodiment places an additional thermal sensor 30, thermal sensor cavity 34, and cavity seal 38 near power contact socket 26 [N].

Thermal sensors 30 (FIGS. 6A & 6B) are shown electrically connected in series.

Figure descriptions for #5 plug (FIGS. 5–5E) apply to #6 plug (FIGS. 6–6D), with the inclusion of an additional thermal sensor 30, thermal sensor cavity 34, and cavity seal 38 in plug #6.

Operation, FIGS. 1 through 6D

Electrical #1 plug 20, illustrated in FIGS. 1–1E, is atypical of the devices presently used to connect a source of electric power to a load, typically an aircraft that is parked.

Ground power #1 plug 20 is used herein as a reference for an "unprotected plug". Each plug, #2 through #6 (FIGS. 2–6D), is presently in use without our "Connector Thermal Sensor" invention.

A problem that occurs with some frequency is excess contact temperature on power contact socket 26 (FIGS. 1–6D). This excess temperature is caused, for instance, by excessive electrical contact resistance between power contact socket 26 and the mating receptacle, usually on an aircraft. The contacts with excessive resistance may be only one or all power contacts 26.

Additionally, any power connections that are improper, within the ground power plugs (FIGS. 1–6D) or the mating receptacle, will cause unacceptable temperatures to be produced.

The result of excessive electrical resistance at or near power contact 26 is the production of a large amount of heat. As the heat increases, the contact electrical resistance increases. The heat build-up causes damage to plug 20 (FIG. 1D), the aircraft connector, and aircraft connector wiring.

Our "Connector Thermal Sensor" provides a means to detect the presence of excess heat in the areas about power contact sockets 26 (FIGS. 1–6D).

Our "Connector Thermal Sensor" consists of the placement of a thermal sensor 30 in close proximity to power contact sockets 26 (FIGS. 2 & 2B typical). Thermal sensor cavity 34 encompasses thermal sensor 30. Cavity seal 38 provides exclusion of the environment from the cavity. More than one thermal sensor may be provided (FIGS. 3, 3B, 6, 6A).

Thermal sensor 30 is a device of variable properties. The properties must be such that a significant change in the resistance or conductance of thermal sensor 30 will occur at a predetermined temperature. The magnitude of this change must be sufficient to cause control circuits, connected via control conductors 24 and power cable 46 (FIGS. 2B & 2D), to respond. The response of the control circuits will cause a change in power flow to the connected load, thus affecting the heat level at thermal sensor cavity 34.

In most instances, thermal sensor 30 will be a normally closed, contact type switch. The switch would open on rising temperature.

In most instances, operation of thermal sensor 30 would cause control circuits to immediately discontinue power to the load.

Thermal sensor 30 will self-reset once the temperature in thermal sensor cavity 38 is reduced to an acceptable level.

With our "Connector Thermal Sensor", protection against excess temperature damage is afforded to both the ground power connecting plug (FIGS. 2–6D) and the mating receptacles.

CONCLUSIONS, RAMIFICATIONS, AND SCOPE

Accordingly, it can be seen that the Connector Thermal Sensor invention will provide a high degree of thermal protection for the aircraft ground power receptacle and its electrical wiring. Additionally, the plug on the ground power cable is simultaneously thermally protected.

Although the description above contains many specificities, these should not be construed as limiting the scope of the invention but as merely providing illustrations of some of the presently preferred embodiments of this invention. Various other embodiments and ramifications are possible within its scope. For example, ground power cables used as extensions or for interconnecting equipment with similar or identical connectors will be afforded the same thermal protection. Thus, the scope of the invention should be determined by the appended claims and their legal equivalents, rather than by the examples given.

What is claimed is:

1. In combination, an aircraft ground electrical connector for use in delivering electrical power to a parked aircraft and a complimentary power connector of the parked aircraft, comprising:

a.) a body of electrical insulating material configured to interact with the complementary power connector of the parked aircraft;

b.) a plurality of electric power delivery arrangements within said body, each of which includes:

1. an electrical power lead;
2. a first power contact electrically connected within said body to said power lead, which power contact is configured to interact electrically with a mating power contact on a parked aircraft;

c.) an electric power control arrangement within said body, said arrangement including:

1. a control lead; and
2. a first control contact electrically connected within said body to said control lead, which control contact is configured to interact electrically with a mating control contact on a parked aircraft; and d.) a thermal sensor within said body positioned to sense a rise in temperature in said body beyond a predetermined temperature, which sensor is electrically connected in series with said electric power control arrangement to prevent power flow through said body upon said predetermined temperature being surpassed within said body.

2. The electrical power connector of claim 1 wherein said electric power control arrangement further includes a second control contact within said body electrically connected to said control lead in series with said first control contact.

3. The electrical power connector of claim 1 wherein said thermal sensor is a normally closed switch.

4. The electrical power connector of claim 1 wherein both said first power contact and said first control contact are female sockets.

5. The electrical power connector of claim 1 wherein said thermal sensor is deposed within a cavity in said body and a seal is provided closing an open end of said cavity.

6. In combination, an aircraft ground electrical connector for use in delivering electrical power to a parked aircraft and a complimentary power connector of the parked aircraft, comprising:

a.) a body of an electrical insulating material configured to interact with a complementary power connector on a parked aircraft;

b.) a plurality of electric power delivery arrangements within said body, each of which includes:

1. an electrical power lead;
2. a first female power socket contact electrically connected within said body to said power lead, which power socket is configured to interact electrically with a mating male power contact on a parked aircraft;

c.) an electric power control arrangement within said body, said arrangement including:

1. a control lead; and
2. a first female control socket contact electrically connected within said body to said control lead which control socket is configured to interact electrically with a mating male control contact on a parked aircraft; and d.) a thermal sensor within said body positioned to sense a rise in temperature in said body beyond a predetermined temperature, which sensor is electrically connected in series with said electric power control arrangement to prevent power flow through said body upon said predetermined temperature being surpassed within said body which thermal sensor is a normally closed contact type switch.

7. The electrical power connector of claim 6 wherein there are a plurality of said electric power control arrangements within said body.

8. The electrical power connector of claim 6 wherein said electric power control arrangement further includes a second female control socket within said body electrically connected within said body to said control lead in series with said first female control socket.

9. The electrical power connector of claim 4 designed to be an intermediary between an aircraft ground power plug and an aircraft, which connector also includes a first projecting pin electrically connected to the first power contact, and a second projecting pin electrically connected to the first control contact.

10. The electrical power connector of claim 6 wherein said thermal sensor is deposed within a cavity in said body and a seal is provided closing an open end of said cavity.

11. The electrical power connector of claim 6 designed to be an intermediary between an aircraft ground power plug and an aircraft, which connector also includes a first projecting pin electrically connected to the first female power socket contact, and a second projecting pin electrically connected to the first female control socket contact.

* * * * *